ABSTRACT# United States Patent Office 2,837,773
Patented June 10, 1958

2,837,773

PROCESS FOR BRIQUETTING TITANIUM SCRAP

Walter W. Eichenberger, Erie, Pa.

No Drawing. Application December 3, 1956
Serial No. 625,630

1 Claim. (Cl. 18—59.3)

This invention relates to briquettes of metallic content and, more particularly, to briquettes from titanium.

In the utilization of titanium scrap, particularly machine turnings, it is desirable to form the scrap into the conventional form of briquettes to facilitate convenient storing, handling, and subsequent utilization, including charging it into a melting furnace. Titanium scrap resulting from machine operations such as turnings obtain an extreme hardness due to working of the metal and it is difficult and impractical to anneal the turnings to remove this hardness so that they can be briquetted. The titanium turnings, because of the hardness they have obtained as a result of the machine operation and the surface oxidation, can be compressed into a compact mass only by exerting on them extremely high pressures. Such pressures are not usually available in any commercially used briquetting press. The product of manufacture of titanium ore is commonly known as titanium sponge. It is ductile and may easily be briquetted.

It is, accordingly, an object of this invention to provide a method of briquetting titanium turnings and scrap which is simple, economical, and practical.

Another object of this invention is to provide a briquette of titanium made up of titanium turnings and scrap mixed with titanium sponge.

A further object of this invention is to provide a method for briquetting titanium turnings and scrap.

A still further object of this invention is to provide a briquetting method wherein titanium turnings are mixed with titanium sponge and exposed to relatively high pressures whereby the titanium sponge acts as a matrix for supporting the titanium turnings.

The above objects and others which may be later referred to, together with others apparent to those skilled in the art, may be attained by carrying out the invention in the manner hereinafter described in detail.

In carrying out this invention to produce the briquettes from any desired titanium turnings or scrap, a quantity of titanium turnings or scrap thoroughly mixed with titanium sponge is put into a briquetting press. Pressure of the briquetting press is then exerted on the mixture of sponge and scrap and the mixture is compressed into a heterogeneous briquette wherein the sponge acts as a matrix for holding the titanium in place in the briquette and the process results in a durable briquette of desirable density.

An example of the proportions of titanium turnings and titanium sponge which may be used together to form a briquette according to the invention is:

Titanium turnings_____50% to 75% by weight.
Titanium sponge_____25% to 50% by weight (see note.)

NOTE.—If less than fifty percent sponge is used, an insufficient matrix is provided. It is impractical to use more than seventy-five percent sponge since, at this point, the briquette becomes predominantly sponge.

Briquettes made in the manner of the example have sufficient strength to withstand severe abuse at normal and even rough handling and at normal handling and transportation temperatures.

The foregoing specification sets forth the invention in its preferred practical forms but the method described is capable of modification within a range of equivalents without departing from the invention which is to be understood is broadly novel as is commensurate with the appended claim.

The embodiments of the invention in which an exclusive property or privilege is claimed are defined as follows:

A method of forming briquettes from titanium scrap which has obtained an extreme hardness due to working thereof comprising providing said titanium scrap in unannealed form having oxidized surfaces, mixing titanium sponge in an amount at least equal to the weight of said scrap with said scrap to form a matrix for said scrap, and placing said scrap and said sponge in a briquetting press and applying a pressure thereto whereby said scrap and said sponge are formed into a briquette with said sponge forming a matrix for said scrap.

References Cited in the file of this patent

UNITED STATES PATENTS

| | | |
|---|---|---|
| 1,704,256 | Lorenz | Mar. 5, 1929 |
| 2,169,281 | Pfanstiehl | Aug. 15, 1939 |
| 2,289,787 | Kaschke et al. | July 14, 1942 |
| 2,708,770 | Harres et al. | May 24, 1955 |

UNITED STATES PATENT OFFICE
CERTIFICATE OF CORRECTION

Patent No. 2,837,773     Dated June 10, 1958

Inventor(s) Walter W. Eichenberger

It is certified that error appears in the above-identified patent and that said Letters Patent are hereby corrected as shown below:

Column 2, line 16, change "fifty" to --twenty-five--

Signed and sealed this 24th day of April 1973.

(SEAL)
Attest:

EDWARD M. FLETCHER, JR.  ROBERT GOTTSCHALK
Attesting Officer        Commissioner of Patents